(No Model.)  2 Sheets—Sheet 1.

T. H. DUFFY.
SEWER CLEANER.

No. 356,754. Patented Feb. 1, 1887.

Witnesses:
L. L. Bond
Albert H. Adams

Inventor:
Thomas H. Duffy (No Model.) 2 Sheets—Sheet 2.

T. H. DUFFY.
SEWER CLEANER.

No. 356,754. Patented Feb. 1, 1887.

Witnesses:
L. L. Bond
Albert H. Adams

Inventor:
Thomas H. Duffy

UNITED STATES PATENT OFFICE.

THOMAS H. DUFFY, OF CHICAGO, ILLINOIS.

SEWER-CLEANER.

SPECIFICATION forming part of Letters Patent No. 356,754, dated February 1, 1887.

Application filed May 11, 1886. Serial No. 201,878. (No model.)

*To all whom it may concern:*

Be it known that I, THOMAS H. DUFFY, residing at Chicago, in the county of Cook and State of Illinois, and a citizen of the United States, have invented certain new and useful Improvements in Sewer-Cleaners, of which the following is a full description, reference being had to the accompanying drawings, in which—

Figure 1:
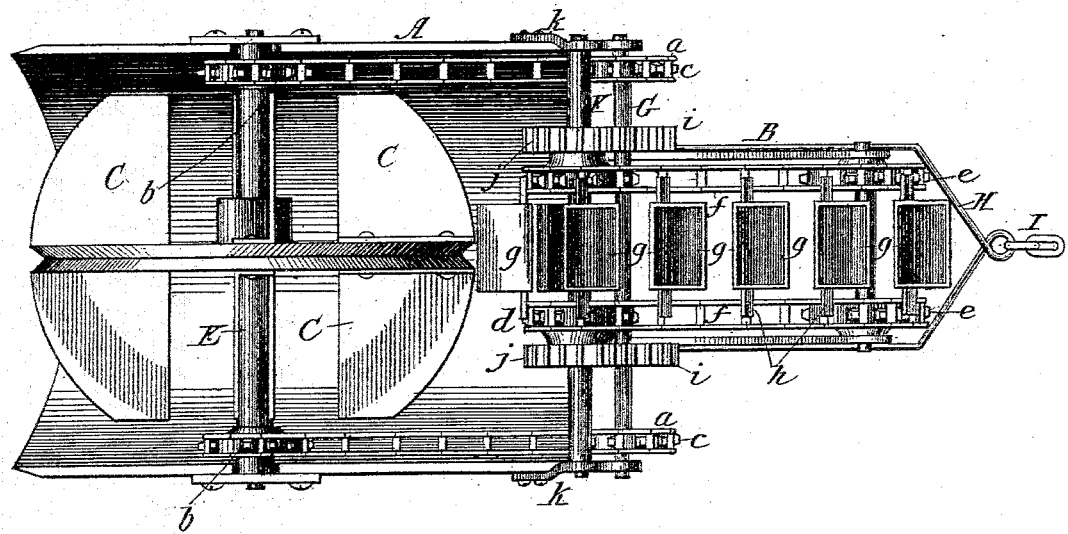
Figure 2:
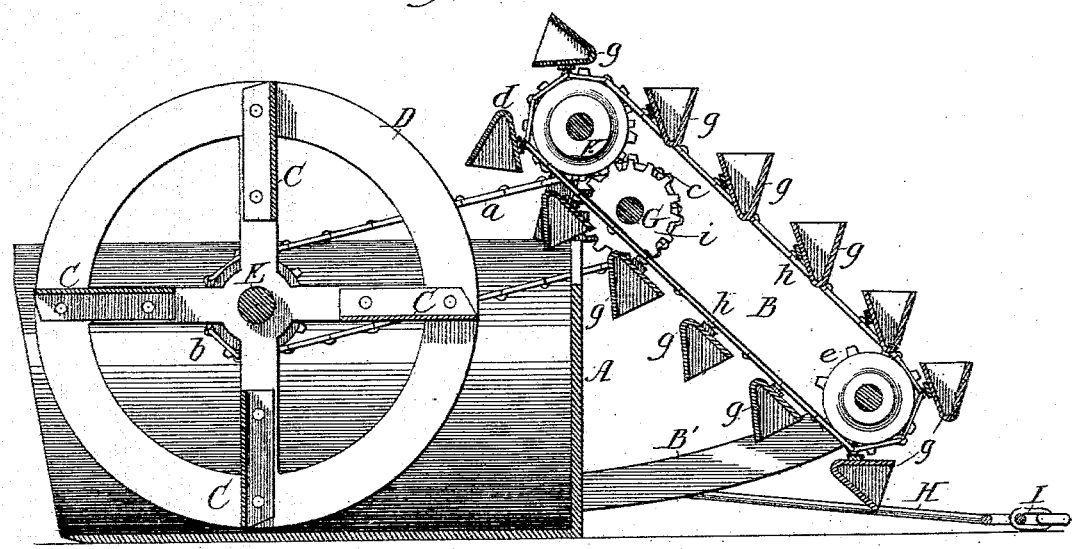
Figure 4:
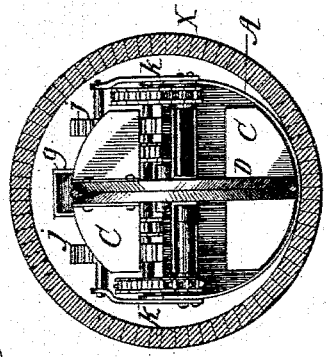
Figure 3:
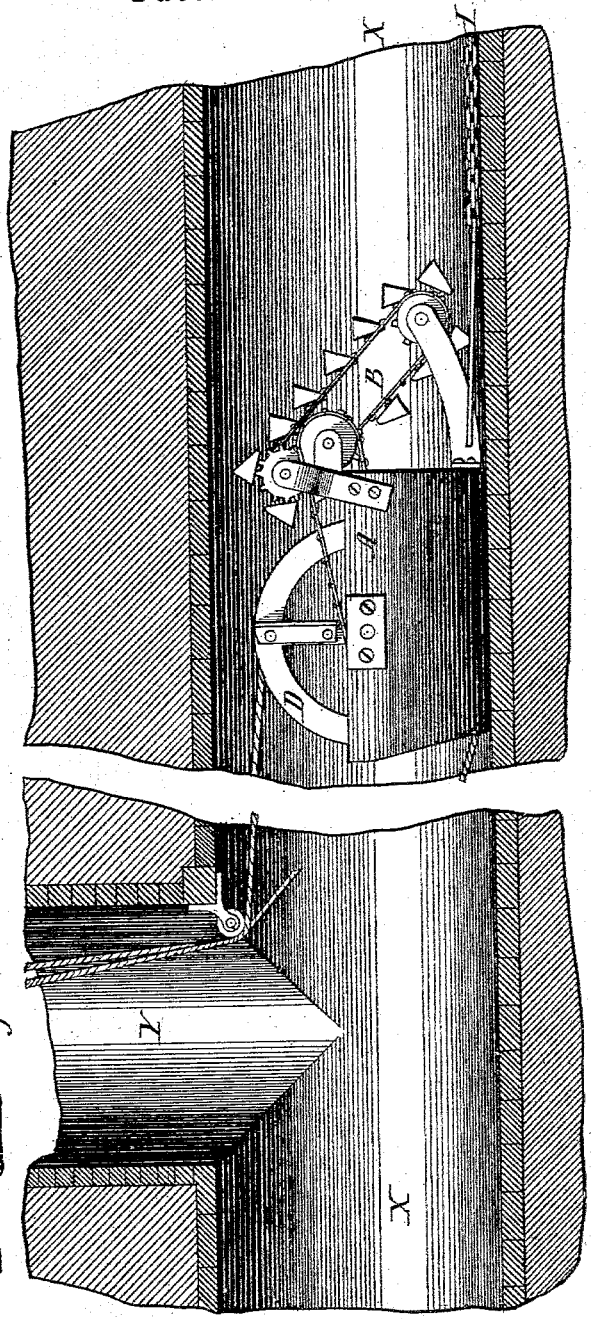
Figure 3:
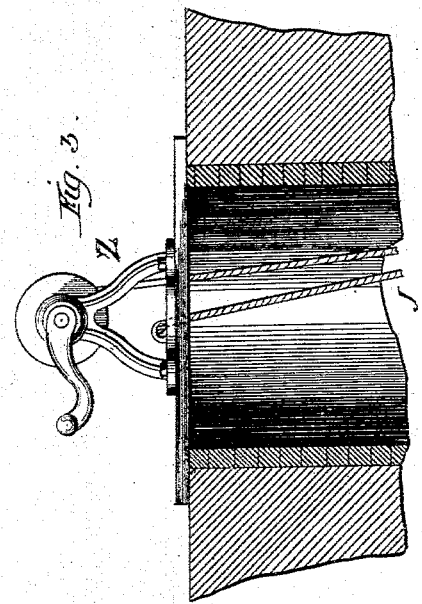

Figure 1 is a top or plan view; Fig. 2, a longitudinal vertical section; Fig. 3, a sectional view of a sewer, showing the apparatus in position; Fig. 4, a cross-section of a sewer, showing the space occupied by the device or machine.

The object of this invention is to provide a machine or scraper which will bring the sedimentary matter in a sewer down to or within reach of the man-holes, so that it can be removed, or to the discharge-opening of the sewer, as may be most convenient; and its nature consists in the several improvements and combinations hereinafter set forth and claimed as new.

In the drawings, A indicates the scoop; B, the water-elevator; C, the blades or agitators on the driving-wheel; D, the driving-wheel; E F G, shafts; H, frame or bail for connecting a chain with the rear end; I, chain; J, operating-rope; *a*, drive-chains; *b c d e*, sprocket-wheels; *f*, drive-chains; *g*, elevator-buckets; *h*, cross-bars supporting the buckets; *i j*, gear-wheels; *k*, supports for the shafts F G; X, section of sewer; Y, man-hole; Z, windlass.

The scoop A is best made of light boiler-iron, and the rear end provided with a cross or end plate, as shown in Fig. 2, which may be riveted or otherwise attached to the concave portions of the scraper. Across the scraper is placed the shaft E, to which the driving-wheel D and the sprocket-wheels *b* are attached in the position shown. The wheel D has its sides provided with fan or agitating blades C, which stir up and agitate the gathered deposit, so that it can be washed or driven along in front of the machine.

The driving-wheel D is provided with arms, to which the wheels and these blades are attached, and more or less of them can be applied, although four will be found sufficient. The rim of the wheel is provided with a groove, in which the operating-rope is placed and held.

This driving-wheel may be diminished in size if it is desired to give a more rapid movement to the agitating-blades, and the blades may be made to project beyond the rim of the wheel; or the whole agitator may be reduced in size, in which case the shaft E will be lowered, so that the blade C will come near the bottom of the scraper when rotated.

The rear end of the machine is provided with brackets or supports *k* for the shafts F G, and they may be in the form shown or in any other suitable form. The sprocket-wheels *c* and gear-wheels *i* are attached to the shaft G, which is driven by the chains *a*. The shaft F supports the upper end of the water-elevator, and is provided with the gear-wheels *j*, which engage with the wheels *i*. The shaft F is also provided with the sprocket-wheels *d*, upon which the bucket-chains *f* are mounted, and which pass around the sprocket-wheels *e* at the lower end of the elevator. These lower sprocket-wheels are mounted upon a suitable shaft to keep them in position. The chains *f* are connected together by cross-bars *h*, upon which the buckets *g* are mounted.

The elevator-frame is supported at the front end upon the head of the scraper and at its rear end by the supports B', and the elevator is so arranged that the buckets will come as near the bottom of the sewer as their safety will permit. The rear end of the scraper is also provided with an iron frame or bail, H, to which is attached a long chain, I. This chain should be equal to the distance between one man-hole and another, and it tends to keep the scraper in a proper vertical position, and it also enables a person standing in the rear to pull the scraper back in case it gets caught or meets with any obstruction during its passage from one man-hole to another or to the discharge end of the sewer. An operating-rope, J, is placed around the wheel D, one end of which is fast and the other end attached to a windlass or made to pass around a pulley, to be operated by one or more horses.

The rope may be made of ordinary cordage, or it may be a wire rope, and in Fig. 3 I have shown a device to prevent it from coming in contact with the turn of the man-hole; but the wheel there shown should be connected with a depending bar or board, or be otherwise detachably held.

It will be understood that the machines will vary in size according to the size of the sewer to be cleaned; but the apparatus is more especially designed for small sewers, which are difficult for men to pass through and clean.

In operation the machine is passed down through the man-hole and placed in position. The operating-rope J is then placed around the wheel D. The drawing of one end of the rope by the windlass Z causes the wheel D to rotate and the scraper to advance. The rotation of the wheel through the drive-chains communicates motion to the elevator, the buckets of which lift water from the rear of the scraper and discharge it into the scraper, so as to cause a current which will wash the light sediment of the sewer forward as it is drawn along and aid in driving the sewer-sediment along in front of the scraper as it is agitated and stirred up by the scraper and the blades C. When the mass of sediment reaches the man-hole where the power is applied, the sediment is lifted in the ordinary manner. The rope J is then advanced and reset, ready for continuing the operation. The resetting will only be necessary in very long sewers, as with short sewers they may be cleaned by a single operation, in which case the windlass or other moving power is set at the mouth of the sewer.

As the machine is liable to be too long to turn from the man-hole into the sewer, it is made to be easily taken apart by detaching the arms or supports k and the braces or supports B', so that it can be lowered in sections, which are readily put together again after the machine is turned or placed in the sewer; and the scoop may be made in halves or sections to facilitate the placing of it in position.

In withdrawing the machine bodily from the sewer when taken up through a man-hole, it will be liable to damage the buckets less by moving it past and lifting it from the rear end by the chain I. However, as the machine is ordinarily advanced to the mouth of the sewer, it will come out at that point without lifting.

By the use of this machine, sewers which are too small for men to work in with convenience or too small for them to enter can be rapidly and thoroughly cleansed at much less expense than they can be otherwise cleaned.

What I claim as new, and desire to secure by Letters Patent, is—

1. The combination of the wheel D, having the agitating-blades C, with the semicircular scraper A, substantially as specified.

2. The combination of a water-elevator with a semicircular scraper adapted to be drawn along a sewer, substantially as described.

3. The combination of the scraper A, having the driving and agitating wheel C D, with the elevator B, constructed and operating substantially as set forth.

4. The combination of a scraper, A, driving-wheel D, and drive-chains a, with the shafts G F, elevator chains or belts f, and elevating-buckets g, substantially as specified.

5. The bail or frame H and chain I, in combination with the scraper A and elevator B, substantially as described.

6. The combination of the scraper A, driving-wheel D, having the agitating-blades C, and rope J, whereby the agitator is rotated as the scraper is drawn along, substantially as set forth.

7. The combination and arrangement of the scraper A, elevator B, and driving-wheel D with the rope J, bail H, and chain I, substantially as specified.

THOMAS H. DUFFY.

Witnesses:
L. L. BOND,
ALBERT H. ADAMS.